United States Patent
de Lind van Wijngaarden et al.

(10) Patent No.: US 8,189,029 B2
(45) Date of Patent: May 29, 2012

(54) PORTABLE VIDEO CONFERENCING SYSTEM WITH UNIVERSAL FOCAL POINT

(75) Inventors: Adriaan J. de Lind van Wijngaarden, New Providence, NJ (US); Bilgehan Erman, Marlboro, NJ (US); Vanita K. Katkar, White House Station, NJ (US); Elissa P. Matthews, Watchung, NJ (US); Ronald L. Sharp, Clinton, NJ (US)

(73) Assignee: Alcatel Lucent, Paris (FR)

( * ) Notice: Subject to any disclaimer, the term of this patent is extended or adjusted under 35 U.S.C. 154(b) by 421 days.

(21) Appl. No.: 12/457,414

(22) Filed: Jun. 10, 2009

(65) Prior Publication Data
US 2010/0315481 A1    Dec. 16, 2010

(51) Int. Cl.
*H04N 7/14*    (2006.01)
(52) U.S. Cl. .................................. 348/14.07; 348/14.01
(58) Field of Classification Search ............... 348/14.07, 348/14.08, 14.09, 14.01, 14.03, 207.1, 373; 361/679.05, 679.06, 679.07, 679.27, 679.28
See application file for complete search history.

(56) References Cited

U.S. PATENT DOCUMENTS

| | | | |
|---|---|---|---|
| 5,856,819 A | 1/1999 | Vossler | |
| 5,921,780 A | 7/1999 | Myers | |
| 6,209,266 B1 | 4/2001 | Brane et al. | |
| 7,215,313 B2 | 5/2007 | Giraldo et al. | |
| 7,643,275 B2 * | 1/2010 | Williams et al. | 361/679.05 |
| 7,903,080 B2 * | 3/2011 | Yuuki et al. | 345/102 |
| 2008/0297589 A1 * | 12/2008 | Kurtz et al. | 348/14.16 |
| 2010/0245534 A1 | 9/2010 | De Lind Van Wijngaarden et al. | |
| 2011/0059777 A1 * | 3/2011 | Rao | 455/566 |

FOREIGN PATENT DOCUMENTS
WO    WO 03/077231    9/2003
* cited by examiner

*Primary Examiner* — Stella Woo
(74) *Attorney, Agent, or Firm* — Harness, Dickey & Pierce

(57) ABSTRACT

Embodiments of the present invention are directed to compact portable video conferencing systems, which eliminate the need for other meeting room appliances for a video conference. The systems provide the freedom to hold video conferences with a few participants in any setting, e.g., a manager's office, a conference room, multiple locations, etc. Embodiments provide portable video conferencing systems, which allow all the meeting participants, including local and remote users, to maintain constant eye contact throughout the meeting. An embodiment of the invention provides a portable video conferencing system including a base, a dual-sided display and a camera unit.

21 Claims, 5 Drawing Sheets

PORTABLE VIDEO CONFERENCING SYSTEM WITH UNIVERSAL FOCAL POINT

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

Many people do not find video conferencing a practical way in which to conduct meetings on a regular basis. Multiple focal points and different interfaces may disrupt the natural flow of conversation among meeting participants. Projected presentations, notes on a whiteboard, speakers in the meeting room, and speakers at remote sites, e.g., viewed via a monitor, create multiple focal points in different sections of a meeting room. Therefore, participants may find themselves constantly switching between different focal points.

Using portable and configurable video conferencing equipment can increase the practicality of video conferencing, e.g., which would allow setting up video conferencing in any meeting room. However, with equipment available today, portability still includes moving around bulky monitors, which considerably limits the practicality, especially for small meetings with few people. Also configurability for focused or broad coverage still requires changing a multiplicity of heavy cameras, angles and mounts.

In addition, desktop video conferencing (e.g., through a computer, etc.) for a meeting including 3-4 people around a small table in a manager's office is not sufficient, nor does an ordinary office have room for typical video conferencing equipment, portable or not.

SUMMARY OF THE INVENTION

Embodiments of the present invention are directed to compact portable video conferencing systems, which eliminate the need for other video conference meeting room appliances. Embodiments provide the freedom to hold video conferences with participants in any setting, e.g., a manager's office, a conference room, multiple locations, etc.

Embodiments of the invention allow all the meeting participants, including local and remote users, to maintain eye contact throughout the meeting.

An embodiment of the invention provides a portable video conferencing system including a base, a dual-sided display and a camera unit. The dual-sided display includes a frame and may be configured to attach along a side of the base. The camera unit is attached to a portion of the dual-sided display frame and may rotate 360 degrees around a vertical axis. The dual-sided display may be a dual-sided liquid crystal display, plasma display, organic LED display, etc. or a combination thereof.

Another embodiment includes the base being a multi-point control unit (MCU), which controls the dual-sided display and the camera unit. The MCU may include various inputs and outputs, including, e.g., keyboards, digital tablets, video inputs, video outputs, wired network inputs, wired network outputs, wireless network transceiver, a touch screen, PSTN phone line connector, telephone apparatus connector, audio inputs, and audio outputs. The MCU may operate using DC power. The DC power may be supplied using an external AC-DC power adaptor. The DC power may also be supplied using an internal battery unit. The external AC-DC power adaptor may also charge the internal batter unit.

In another embodiment, the camera unit provides a 360° degree view and may include multiple cameras with at least one microphone. An embodiment of the invention also includes the dual-sided display having touch functionality and picture-in-picture functionality. Each side of the dual-sided display may also display information independently from the other side.

Embodiments may also include the dual-sided display being two LCDs, each including a frame, where the two LCDs are attached along one side of each frame, so the two LCDs may pivot around each other to face the same direction.

In another embodiment, the system also includes an extender, which pivotally connects to the base on a different side from the dual-sided display and may support the dual-sided when the extender is extended. The extender may attach to the dual-sided display through the camera unit and telescope along a vertical axis.

Embodiments of the invention also include various configurations of the portable video conferencing system. A closed configuration includes a dual-sided display covering a portion of the base. A first viewing configuration includes the dual-sided display and the base being in an open position, where both sides of the dual-sided display are visible. In a second viewing configuration, the extender is in a vertical position with the dual-sided display attached thereto by the camera unit so both sides of the dual-sided display are visible.

Embodiments of the invention also incorporate the portable videoconferencing system being configured to communicate with secondary computers that are either local or remote and/or additional portable video conferencing systems. The remote sites may be able to view and listen to data supplied from the MCU and the camera unit, and the portable videoconferencing system may be able to display and play data supplied from the remote sites via dual-sided display and the audio output.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

In the following description, illustrative embodiments will be described with reference to hardware and acts and symbolic representations of operations (e.g., in the form of flowcharts) that may be implemented as program modules or functional processes including routines, programs, objects, components, data structures, etc., that perform particular tasks or implement particular abstract data types and may be implemented using one or more digital signal processors (DSPs), application-specific-integrated-circuits, field programmable gate arrays (FPGAs), computers, etc.

Embodiments of the invention include portable and configurable video conferencing systems that incorporate various components. The portable and configurable video conferencing systems may arrange these various components into a single unit, which creates a single focal point for all the video conferencing participants (local and remote alike).

Figure 1:
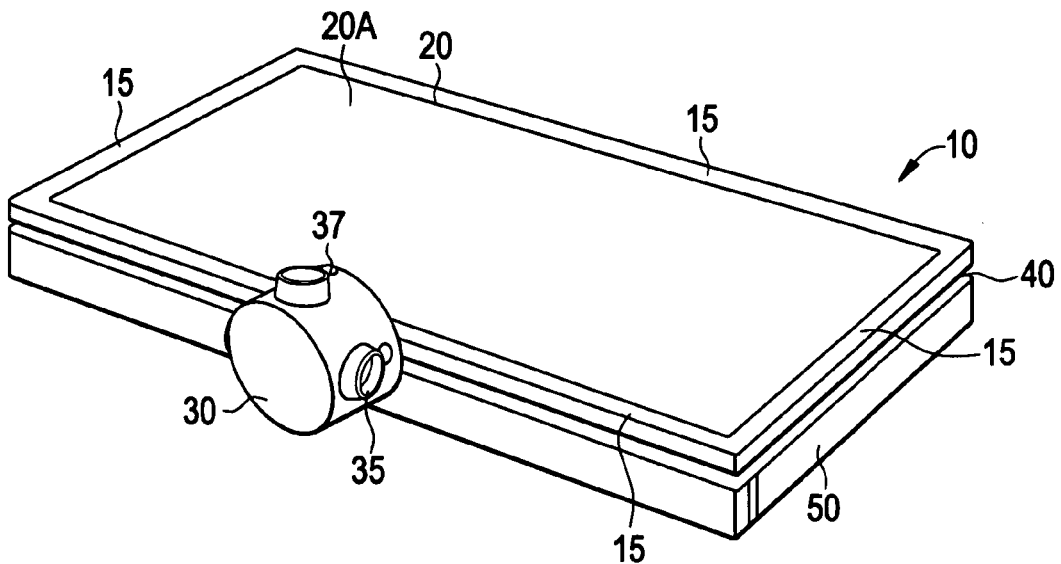
FIG. 1 shows an embodiment of the invention in a closed configuration.

FIG. 1 shows a single unit portable video conferencing system 10 in a closed configuration. The portable video conferencing system 10 includes a dual-sided display 20, a camera cluster 30 attached to the dual-sided display 20, and a base unit 50. Dual-sided display 20 may include liquid crystal displays (LCDs) as the displays. For example, the dual-sided LCD 20 may include two LCD displays 20A and 20B (not shown). However, the displays of dual-sided display 20 are not limited to LCDs. Instead, the displays may be plasma displays, organic LEDs, etc., or a combination thereof. For the sake of description only, this and the other embodiments of the present invention will be described using the example of LCDs for the dual-sided display, but it will be appreciated that the present invention is not limited to this display technology.

The camera cluster 30 may include one or more cameras 35 and one or more microphones 37. Camera unit 30 is attached to the dual-sided LCD 20 through a frame 15. Frame 15 may encircle the outer sides of the dual-sided LCD 20 and for purposes of this disclosure will be considered a part of dual-sided LCD 20. A frame 15 may include any type of structural support for the dual-sided LCD, including, e.g., plastic, metal, etc., having varying thicknesses, lengths, and widths.

Dual-sided LCD 20 is pivotally attached by attachment 40 to base unit 50 along a side of the dual-sided LCD 20 (including frame 15) opposite the side that camera unit 30 is located. The attachment 40 may include various known types of connections, e.g., a single hinge, multiple hinges, etc. As shown in FIG. 1, the dual-sided LCD 20 has one side 20A visible and the other side 20B (not shown) "folded over" and covering the top side of base unit 50. When in this closed configuration, the portable video conferencing system 10 is approximately the size of a laptop computer and may be easily moved between various locations as needed.

Figure 2:
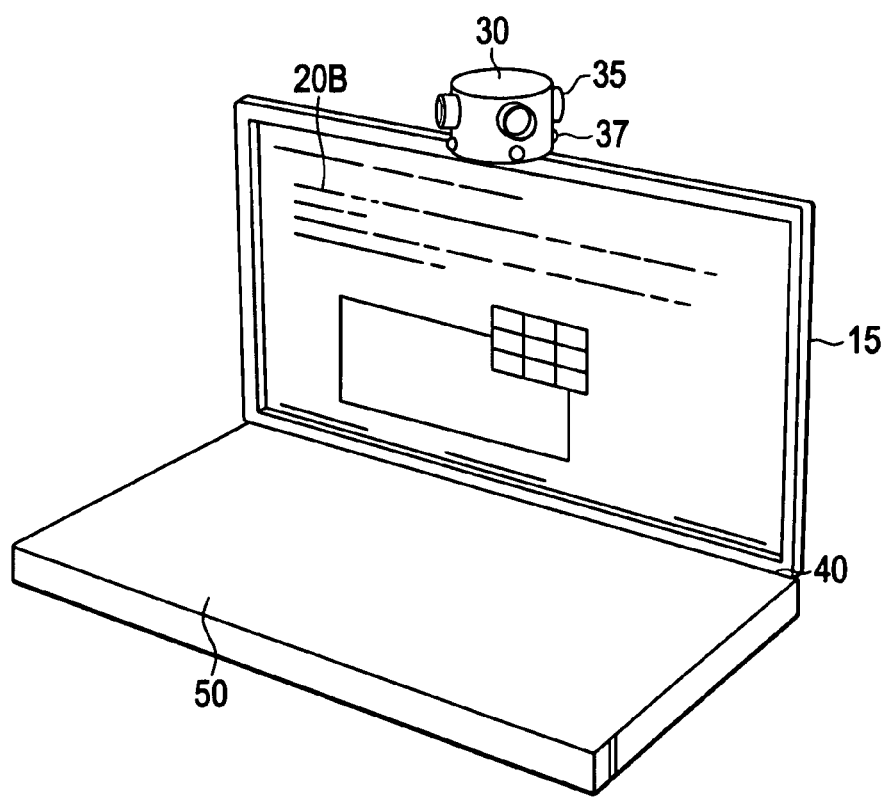
FIG. 2 shows an embodiment of the invention in a first viewing configuration.

FIG. 2 illustrates a first viewing configuration for the portable video conferencing system 10. As shown, side 20B of the dual-sided display 20 is visible to participants as is side 20A (not shown) to participants located behind the portable video conferencing system 10. The dual-sided LCD 20 is shown opened where the dual-sided LCD 20 pivots on hinge 40, similar to how e.g., a laptop or a clamshell opens and closes.

Camera cluster 30 is shown as centered on the top part of the frame 15 of the dual-sided LCD 20. However, the camera cluster 30 may be adjusted, e.g., to be off-center, located on a different side of the dual-sided LCD 20, etc., as preferred for specific meetings. Camera cluster 30 is shown including approximately four cameras 35, but may include various known types and number of cameras. Camera cluster 30 can rotate 360° around a vertical axis to provide coverage of the local surrounding room and any participants therein.

Base unit 50 controls the dual-sided LCD and the camera cluster 30, and functions as, e.g., a video conference multipoint control unit (MCU). Base unit 50 may also accept video inputs, e.g., a projector and provide video outputs to, e.g., a projector, a computer, etc. Base unit 50 may also function as a general purpose computer, e.g., supporting common presentation applications, including hardware (e.g., a keyboard, a mouse, etc.), displaying data, etc. As will be known by those of skill in the art, the MCU may incorporate hardware functionality, client conferencing software, camera support, display support, support for external video and audio, support for PSTN phone lines, wireless communication transceivers, etc. The hardware and software may be known, proprietary, and/or a combination thereof.

Base unit 50 may include various inputs and outputs (not shown), including, for example, keyboards, digital tablets, touch screens, video inputs, video outputs, wired network inputs, wired network outputs, audio inputs, audio outputs, PSTN phone line, telephone apparatus connector, power inputs, etc., and combinations thereof. If the base unit 50 includes a digital tablet (not shown) the digital tablet may function as a virtual whiteboard, which can be seen and edited by both local and remote participants of a video conference.

Dual-sided LCD 20 may be controlled by hardware-based logic and display various data, for example, a presentation, videos of participants, etc. Each side of dual-sided LCD 20 may include touch functionality, picture-in-picture capabilities, etc. and may be configured to display independent data. The portable video conferencing system 10 can also be configured in a piggy back configuration by connecting multiple units back-to-back in order to allow more participants and greater processing power. Still further, the MCU may include software to control, distribute, and manage the video streams to the appropriate screens. Screen area may be divided to contain one or a combination of remote video streams or content. The software may also control the capture of video from local cameras and make it available to remote sites using a pull or push methodology. As an option the software may enable multiple of these systems 10 to be placed side by side to present a wall of video to support more participants or a combination of video content.

As will be appreciated, if multiple screens display the same video and/or provide the same audio content, then a single processor may perform the video and/or audio processing for the multiple screens.

Figure 3:
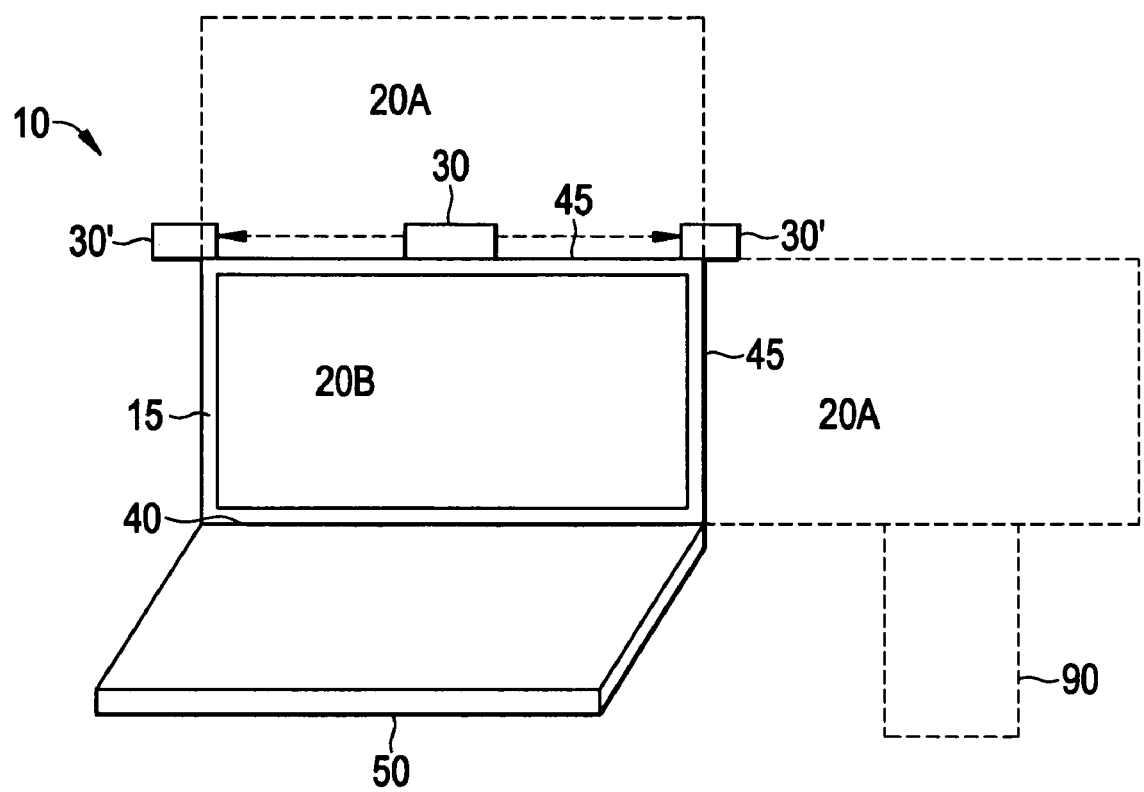
FIG. 3 shows an embodiment of the dual-sided LCD according to the invention.

Another embodiment of the dual-sided LCD 20 shown in FIG. 3 may include the two displays 20A and 20B being separate displays that are "folded together." For example, display 20B may be attached to display 20A along a side of each displays' frame 15 so the displays pivot from a folded position (back to back) as shown in FIG. 2, to an extended position in which displays 20A and 20B are facing in the same direction next to one another, either vertically or horizontally (as shown in FIG. 3 as dotted lines 20A). The extended positioning allows for a larger display (the width or height of two displays) that may be used for presentations, etc. Camera cluster 30 may remain where shown in FIG. 2 or may be capable of moving along the top frame of displays 20A and 20B so when the displays are extended, camera cluster 30 can be moved to a more central location, e.g., centered between the two displays, to one side, etc. (as shown by 30' in FIG. 3). Additionally, a support may be added to the extended display 20A so as to balance the extended display 20A and to prevent the portable video conferencing system 10 from tipping to one side.

Figure 4:
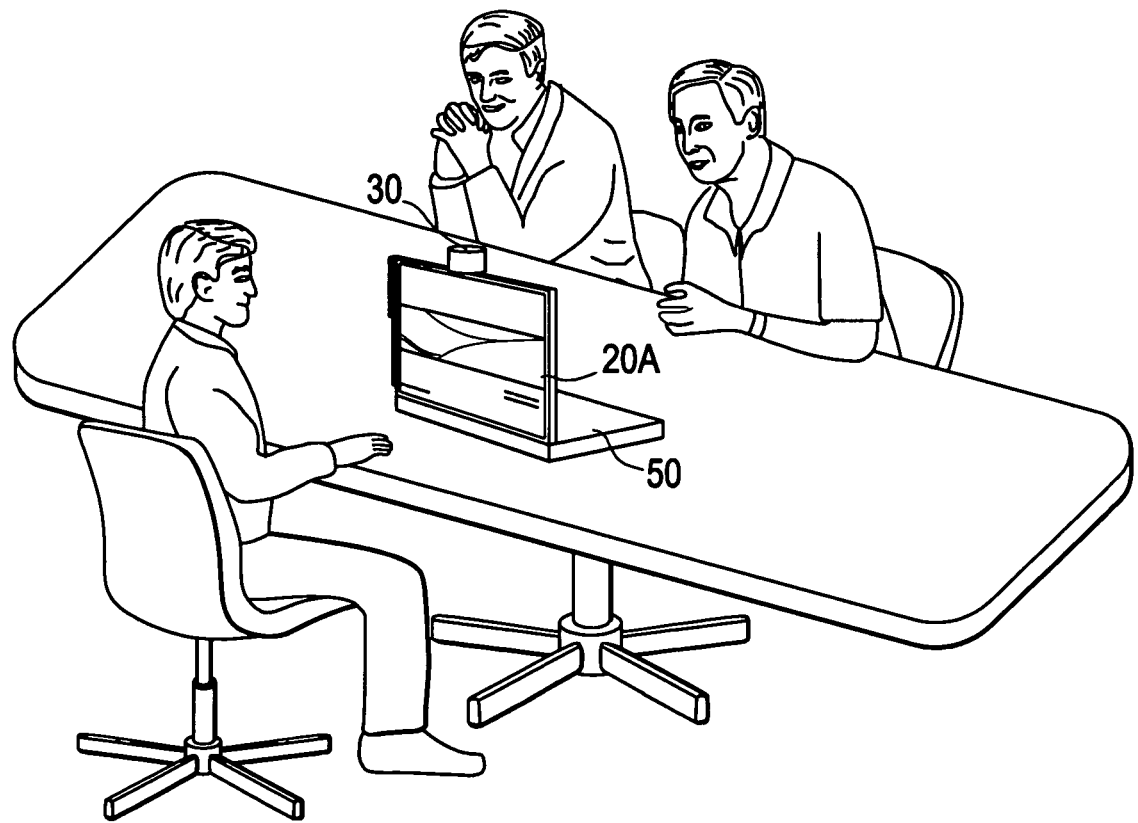
FIG. 4 illustrates the system of FIG. 2 being used for video conferencing according to the invention.

FIG. 4 shows an embodiment of the present invention in which the portable video conferencing system shown in FIG. 2 is used. As shown in FIG. 4, the first viewing configuration may be used for a video conference including any number of participants, but preferably three to six local participants. In FIG. 4, a total of four local participants are shown with half of the participants viewing the conference material on display 20A and the other half are viewing the conference material on display 20B. Camera cluster 30 is shown as being slightly below the eye level of the participants, therefore allowing all of the local participants to have eye contact with each other while viewing the conference material on at least one display 20A, 20B.

In addition, remote locations (not shown) may participate in the video conference. The local participants are able to view the remote participants on the displays 20A, 20B, e.g., through picture-in-picture. Further, the remote participants are able to view the conference material and the local participants, e.g., on a remote computer display in communication with the base unit 50. The 360° view of camera cluster 30 being located at approximately the local participants eye level also allows eye contact between the remote participates and the local participants.

Figure 5:
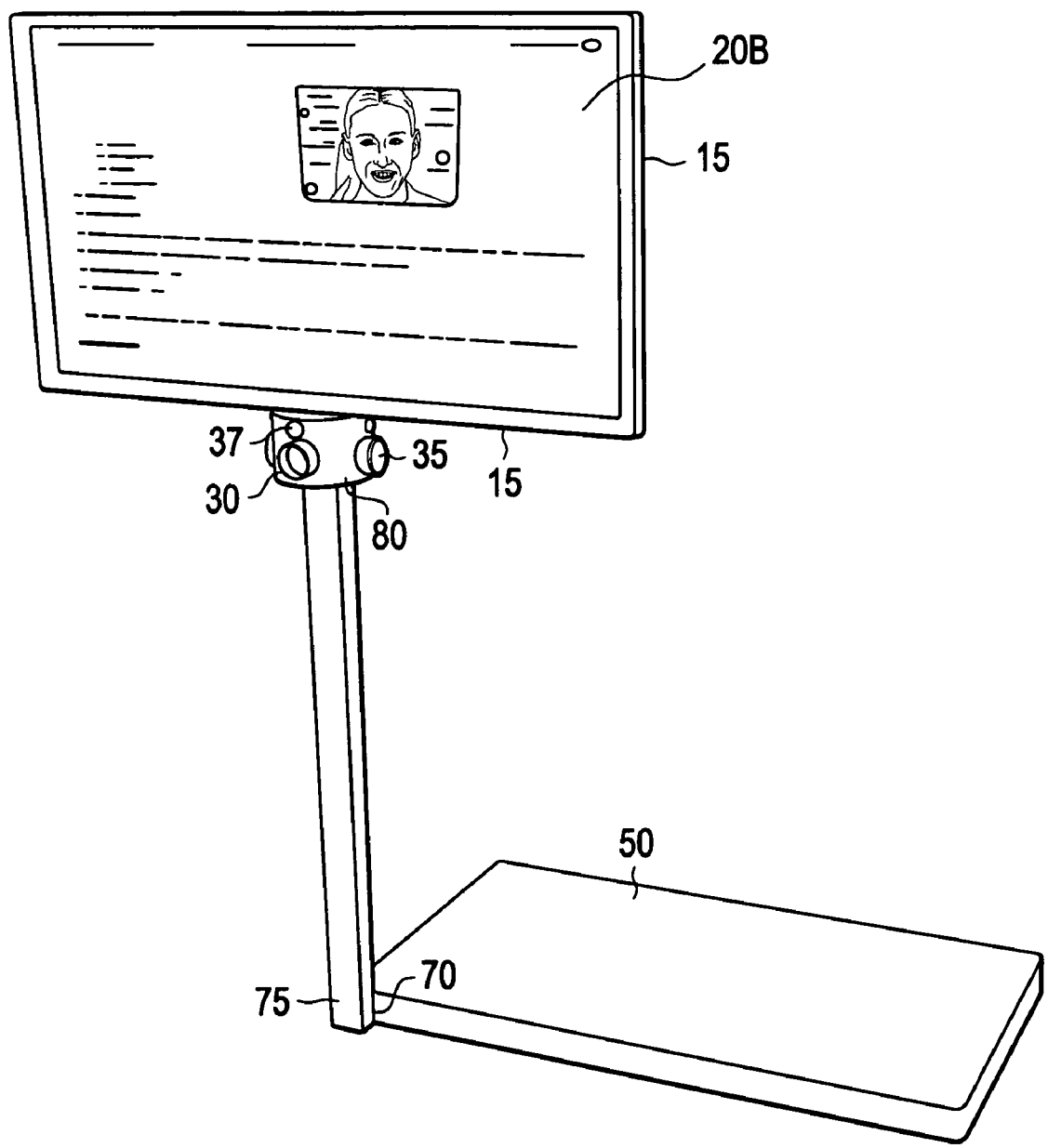
FIG. 5 shows an embodiment of the invention in a second viewing configuration.

FIG. 5 shows another embodiment of the portable video conferencing system 10. In this embodiment, the portable video conferencing system 10 is in a second viewing configuration. As shown in FIG. 5, dual-sided LCD 20 is separated from base unit 50 and mounted on an extender 75. Extender 75 pivots along a pivot 70 from a folded position along a side of base unit 50 opposite from where the dual-sided LCD 20 is attached. Extender 75's height may be adjusted by, e.g., a telescoping mechanism, etc. Dual-sided LCD 20 is attached at 80 to extender 75 through camera cluster 30. Dual-side LCD can rotate around the axis of the extender 75 so that LCD 20A and 20B can be facing any 360 degree angle around the room. As shown, the dual-sided LCD 20 with camera cluster 30 is "upside down". In order for local participates to be able to view at least one of displays 20B, 20A the conferencing software discussed above automatically rotates the display image 180 degrees. The second viewing configuration functions in a similar manner as discussed above with reference to FIG. 2. However, this configuration is preferably used for meetings having more participants than the first viewing configuration, e.g., six to twelve local participants.

Figure 6:
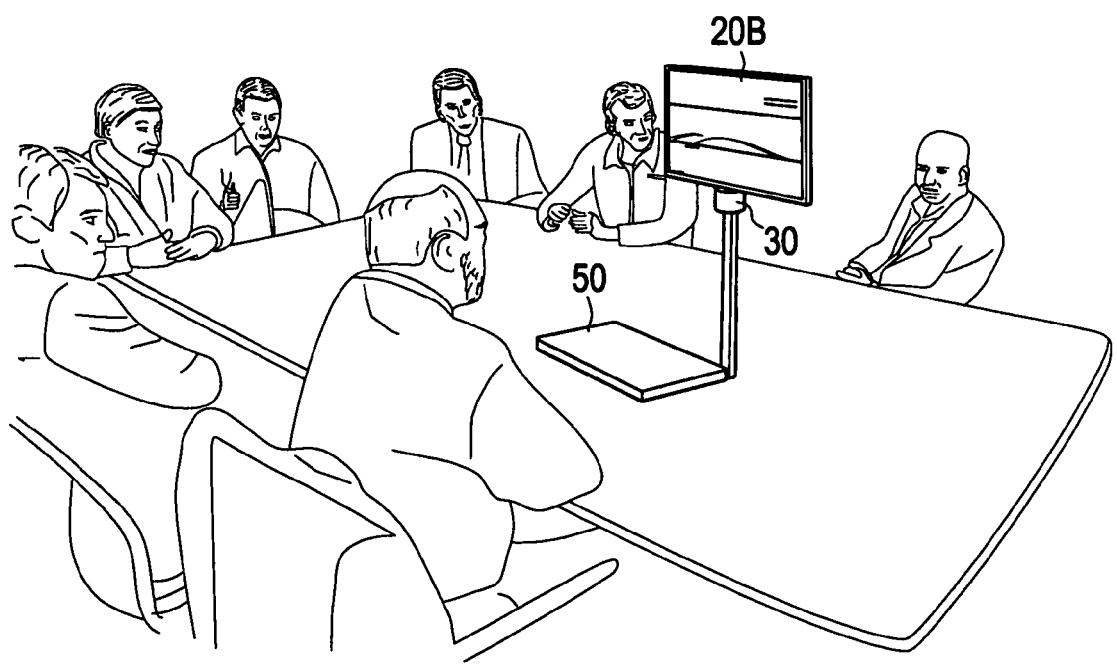
FIG. 6 illustrates the system of FIG. 5 being used for video conferencing according to the invention.

FIG. 6 shows an embodiment of the system 10 being used for a meeting having approximately nine local participants. The raised dual-side LCD 20 allows participants to see at least one display 20A, 20B of the dual-sided LCD with increased ease and comfort when participating in a larger meeting. Camera cluster 30 is shown below the dual-sided LCD 20, while extender 75 keeps camera cluster 30 above the eye level of the seated local participants. Therefore, similar to the first viewing configuration shown in FIGS. 2 and 4 all the local participants have eye contact with each other, while still being able to view at least one display 20A, 20B of the dual-sided LCD 20.

In addition, remote locations (not shown) may participate in the video conference, in a similar manner as in FIG. 4. However, in this configuration the camera cluster 30 is located below the dual-sided LCD 20 but is elevated by extender 75 to maintain camera cluster 30 at approximately the local participates' eye level.

The invention being thus described, it will be obvious that the same may be varied in many ways. Such variations are not to be regarded as a departure from the invention, and all such modifications are intended to be included within the scope of the invention. For example, embodiments of this invention allow a single set of equipment to be reconfigured for different video conferences of different participation types: e.g., a camera focused on a whiteboard for brainstorming sessions, focused on the front of the room for speaker-led presentations or movies, covering the center of the room (conference table) for round table discussions, etc.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

As used herein, the term "and/or" includes any and all combinations of one or more of the associated listed items. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

We claim:

1. A portable video conferencing system, comprising:
    a base;
    a dual-sided display including a frame, configured to attach along a side of the base, the dual-sided display configured to display an image on a first side and the image on a second side of the dual-sided display, the second side being opposite the first side; and
    a camera unit attached to a portion of the frame of the dual-sided display, the camera unit configured to capture video from the first side and the second side, the camera unit adjustable in at least one lateral displacement direction along an edge of the frame, and the base configured to transmit the captured video to a remote location.

2. The system of claim 1, wherein the base is a multipoint control unit (MCU) configured to control the dual-sided display and the camera unit.

3. The system of claim 2, wherein
    the MCU includes at least one of a keyboard, a digital tablet, at least one video input, at least one video output, at least one wired network input, at least one wired network output, at least one wireless transceiver, a touch screen, at least one PSTN phone line connector, telephone apparatus connector, at least one audio input, and at least one audio output; and
    the camera unit is configured to rotate around a vertical axis.

4. The system of claim 1, wherein the camera unit includes at least two cameras.

5. The system of claim 1, wherein the camera unit includes at least one microphone.

6. The system of claim 1, wherein the dual-sided display is further configured to include touch functionality and picture in picture functionality.

7. The system of claim 1, wherein each side of the dual-sided display is further configured to display information independently from the other side of the dual-sided display.

8. The system of claim 1, wherein the dual-sided display includes two LCDs, each including a frame, the two LCDs attached to each other along a side of each frame, the connection configured to allow the two LCDs to pivot around a vertical axis to face the same direction.

9. The system of claim 1, further including:
an extender pivotally connected to the base on a different side from the dual-sided display and configured to support the dual-sided display and the camera unit when extended.

10. The system of claim 9, wherein the camera unit is configured to attach to the extender.

11. The system of claim 9, wherein the extender telescopes along a vertical axis.

12. The system of claim 9, wherein the camera unit and the dual-sided display are rotatable around an axis of the extender.

13. The system of claim 1, wherein when the system is in a closed configuration, the dual-sided display is attached to and covers at least a portion of the base.

14. The system of claim 1, wherein when the system is in a first viewing configuration the dual-sided display is attached to the base to form an open configuration where both sides of the dual-sided display are visible and the camera unit is located above the dual-sided display, and wherein when a video conference is conducted, both sides of the dual-sided display are viewable by a plurality of participants of the video conference.

15. The system of claim 14, wherein the first viewing configuration is used for conferences of five or less local participants.

16. The system of claim 10, wherein when the system is in a second viewing configuration the extender is in a vertical position and the dual-sided display is attached to the extender by the camera unit, and wherein when a video conference is conducted, both sides of the dual-sided display are viewable by a plurality of participants of the video conference.

17. The system of claim 16, wherein the second viewing configuration is used for conferences of six or more local participants.

18. The system of claim 2, further configured to communicate with at least one computer.

19. The system of claim 18, wherein the at least one computer is remote to the system.

20. The system of claim 2, wherein the system is further configured to communicate with a remote video conferencing system, the remote video conferencing system being configured to display data from the MCU and the camera unit.

21. The system of claim 1, further comprising:
an extender connected to the base on a first end and the camera unit on a second end and configured to allow a height of the camera unit to be adjusted to an eye-level of a conference participant.

* * * * *